June 13, 1950 W. H. ELLIOT 2,511,628
ELECTRONIC SYNCHRONOUS TIMING SYSTEM
Filed Jan. 17, 1948

Inventor
William H. Elliot
By Frank H. Hubbard
Attorney

Patented June 13, 1950

2,511,628

UNITED STATES PATENT OFFICE 2,511,628

ELECTRONIC SYNCHRONOUS TIMING SYSTEM

William H. Elliot, Shorewood, Wis., assignor to Cutler-Hammer, Inc., Milwaukee, Wis., a corporation of Delaware Application January 17, 1948, Serial No. 2,942

6 Claims. (Cl. 250—27)

1

This invention relates to a synchronous timing system, and more particularly to a system affording a timed delay in current flow having a definite relation to the cyclic variations of an alternating voltage, and is an improvement of the timing system disclosed and claimed in the copending application of Mark Audier, Ser. No. 718,810, filed Dec. 27, 1946, now United States Patent No. 2,442,578, issued June 1, 1948, and assigned to the same assignee as the present invention.

The present invention has various advantageous applications including control of current supplied by an alternating current source to a translating circuit, and affording the flow of such current a definite time-phase relationship to such alternating current.

An object of the invention is to provide a synchronous timer for alternating currents which closes a circuit for a given period and which starts said period at substantially the same moment of the alternating voltage cycle.

Another object is to provide for wide adjustment of the duration of the aforementioned period.

Another object is to provide such a system which is simple in construction and requires relatively few parts.

Another object is to provide a timing system which is positive and consistent in operation.

Other objects and advantages of the invention will hereinafter appear.

The accompanying drawings illustrate a system for the control of the energizing circuit of an electromagnetic relay in accordance with the invention.

Figure 1:
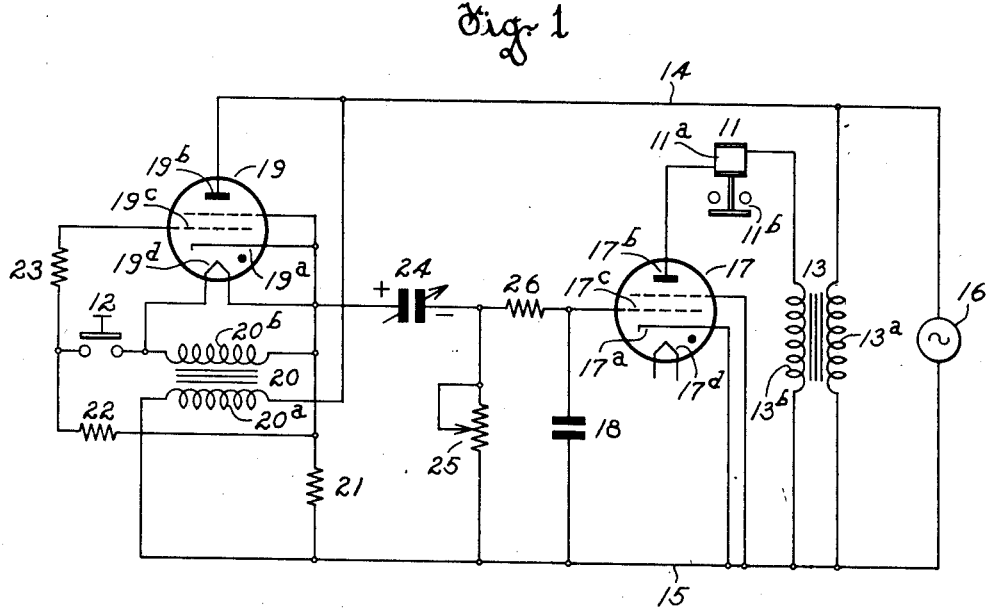
Figure 2:
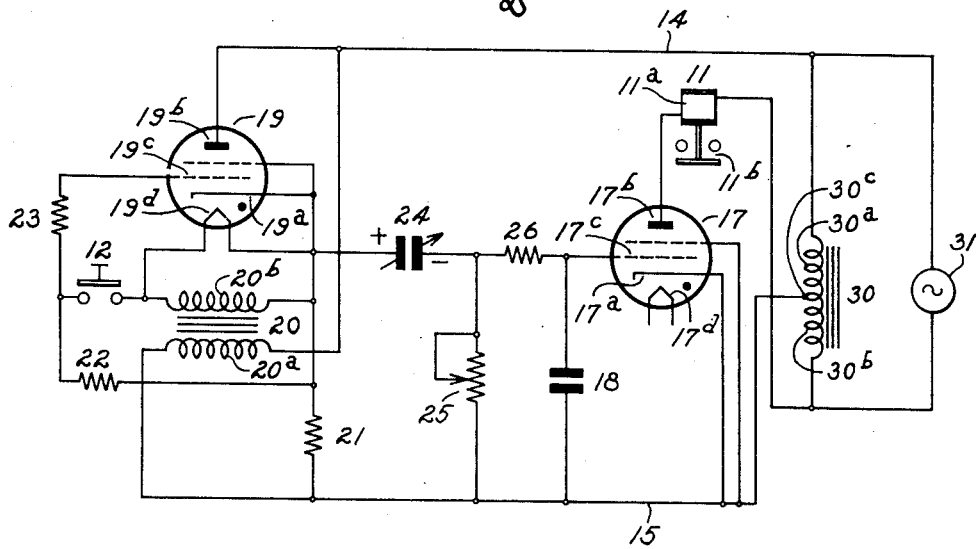

In the drawing Fig. 1 illustrates a system which is supplied with energy through a step-up three wire autotransformer, and, Fig. 2 shows a modified form of the invention employing a step down transformer.

Referring to Fig. 1, a relay 11 is provided with an energizing winding 11a and normally open contacts 11b, which in turn may be employed for the control of a translating circuit which it may be desired to commutate in timed response to operation of an initiating device, such as a normally open push button switch 12. One terminal of the energizing winding 11a is connected to one outside terminal of a step-up winding 13b of an auto transformer 13, which has a primary winding 13a connected across a pair of bus bars 14 and 15, which in turn are connected to a source of alternating current, which is shown as comprising a generator 16. The voltage induced in winding 13b is 180° out of phase with the voltage

2 in winding 13a. The second terminal of the winding 11a is connected to the anode 17b of a gaseous electron tube 17, which also has a cathode 17a, a control electrode 17c, and a heating filament 17d. The cathode 17a is connected directly to the bus bar 15, while the control electrode 17c is also connected to the bus bar 15, through a smoothing capacitor 18. A second gaseous electron tube 19 has a cathode 19a, an anode 19b, a control electrode 19c, and a heating filament 19d. Anode 19b is connected to the bus bar 14, and heating filament 19d is connected across the secondary winding 20b of a filament transformer 20, which has a primary winding 20a connected across the bus bars 14 and 15. One terminal of the secondary winding 20b is also connected through a resistor 21 to the bus bar 15, and also through resistors 22 and 23 to a control electrode 19c of the tube 19.

The common point of resistors 22 and 23 is connected through the push button switch 12 to the other terminal of the winding 20b. The cathode 19a is connected in series with a capacitor 24 and an adjustable resistor 25 to the bus bar 15, while the common point of said capacitor 24 and resistor 25 is connected through a resistor 26 to the aforementioned control electrode 17c.

The system thus far described operates in the following manner: When the bus bars 14 and 15 are energized from the generator 16 a voltage is induced in the secondary winding 13b which is 180° displaced from the voltage in the winding 13a and thus from bus bar voltage. With the switch 12 open, the potential of the control electrode 19c is substantially that of the cathode 19a and tube 19 conducts current during the positive half cycle of the voltage of winding 13a and hence of the voltage between the bus bars 14 and 15. A charging current therefor flows from bus bar 14, through tube 19, capacitor 24 and resistor 25 to bus bar 15, until the capacitor 24 is fully charged. It is to be noted that during these half cycles the potential impressed upon the anode 17b of tube 17 is negative with respect to cathode 17a so that tube 17 is non-conducting and relay 11 remains deenergized.

If now the switch 12 is closed, the alternating voltage induced in the winding 20b is impressed upon the control electrode 19c, the polarity being such that the potential of control electrode 19c is 180° out of phase with the potential between the main electrodes 19a and 19b. If at the moment of closure of switch 12 the tube 19 is already conducting a current, the latter will continue to flow to the end of the respective half cycle. However, during the next succeeding half cycle the current will cease to flow due to the reversal of potential between the main electrodes 19ª and 19ᵇ, while at the next and further positive half cycles initiation of current flow is blocked by the negative potential of the control electrode 19ᶜ.

During the half cycles when the bus bar 14 is positive with respect to bus bar 15, the control electrode 17ᶜ may be positive with respect to the cathode 17ª, but as noted above anode 17ᵇ is negative with respect to cathode 17ª, due to the reversal of polarity in the transformer winding 13ᵇ. On the other hand, after capacitor 24 has discharged the control electrode 17ᶜ is substantially at the potential of its associated cathode 17ª, thus rendering tube 17 conducting during its respective positive half cycle. After the switch 12 is closed capacitor 24 discharges, and after a time interval depending upon the discharge rate of the capacitor 24 as determined by resistors 21 and 25, the negative potential of control electrode 17ᶜ with respect to the cathode 17ª decreases to a value which again permits current conduction by tube 17 and reenergization of winding 11ª. The cycle may be repeated by opening and reclosing of switch 12.

Fig. 2 illustrates a modification of the auto transformer connections shown in Fig. 1. The transformer 30 has a winding comprising two sections 30ª and 30ᵇ, which are connected in series across the terminals of an alternating current generator 31. The bus bar 15 is connected to a terminal 30ᶜ common to the winding sections 30ª and 30ᵇ. All other connections are the same as in Fig. 1.

Thus the tube 17 is rendered conducting and hence the relay winding 11ª is energized a predetermined interval after the tube 19 becomes non-conducting upon closure of switch 12 and tube 17 remains conducting until the switch 12 is again opened. Opening of switch 12 again charges the capacitor 24 to afford conditions for a new cycle of operation.

The normally open contacts 11ᵇ may be replaced by normally closed contacts, which then open their circuit during the time interval when the tube 17 is conducting. Other modifications within the scope of the present invention will be apparent to those skilled in the art.

I claim:

1. In combination, a three-wire alternating current source, a gaseous tube having an anode and a cathode respectively connected to one outside terminal and the intermediate terminal of said source and also having a control electrode, a resistor in said cathode connection, a capacitor having one of its plates connected to said cathode and its opposite plate connected to said intermediate terminal of said source, a discharge resistor in the connection last mentioned, connections for said control electrode normally to subject it to substantially the potential of said cathode for current flow through said tube during alternate half cycles to charge said capacitor, means to subject said control electrode to a superposed potential such as to block repeated initiation of current flow through said tube, thereby providing for discharge of said capacitor through said resistors, and a second gaseous tube having a cathode connected to said intermediate terminal and an anode connected to the second outside terminal of said source and having a control electrode connected to said opposite plate of said capacitor thereby to afford as a function of discharge of said capacitor a given condition of said second tube in definite time-phase relation to the alternating current of said source.

2. In combination, a three-wire alternating current source, a resistor, a first gaseous tube having a control electrode, a cathode connected through said resistor to the intermediate terminal of said source and an anode connected to one outside terminal of said source, a capacitor having one plate connected to said cathode, a discharge resistor connected between the other plate of said capacitor and said intermediate terminal, means to normally impress upon said control electrode substantially the potential of said cathode to afford current flow through said tube during alternate half cycles for charging said capacitor, means to superpose upon said control electrode a supplemental potential which prevents initiation of said current flow for permitting discharge of said capacitor through said resistors, and a second gaseous tube connected between said intermediate and the other outside terminal of said source and having a control electrode connected to said other plate of said capacitor to render said second tube normally non-conducting during said alternate half cycles and to render it conducting after the charge of said capacitor has been reduced to a given value in response to operation of said last mentioned means.

3. In combination, a three-wire alternating current source, a resistor, a first gaseous tube having a control electrode, a cathode connected through said resistor to the intermediate terminal of said source and an anode connected to one outside terminal of said source, a capacitor having one plate connected to said cathode, a discharge resistor connected between the other plate of said capacitor and said intermediate terminal, means to normally impress upon said control electrode substantially the potential of said cathode to afford initiation of current flow through said tube during alternate half cycles for charging said capacitor, means to superpose upon said control electrode a supplemental alternating potential which prevents initiation of said current flow for permitting discharge of said capacitor through said resistors, and a second gaseous tube connected between said intermediate and the other outside terminal of said source and having a control electrode connected to said other plate of said capacitor to render said second tube normally non-conducting during said alternate half cycles and to render it conducting after the charge of said capacitor has been reduced to a given value in response to operation of said last mentioned means.

4. In combination, a three-wire alternating current source, a resistor, a first gaseous tube having a control electrode, a cathode connected through said resistor to the intermediate terminal of said source and an anode connected to one outside terminal of said source, a capacitor having one plate connected to said cathode, a discharge resistor connected between the other plate of said capacitor and said intermediate terminal, means to normally impress upon said control electrode substantially the potential of said cathode to afford initiation of current flow through said tube during alternate half cycles for charging said capacitor, means to superpose upon said control electrode a supplemental potential which prevents initiation of said current flow for permitting discharge of said capacitor through said resistors, a translating device, a second gaseous tube connected in series with said device between said intermediate and the other outside terminal of said source, said second tube having a control electrode, and means to impress the voltage across said discharge resistor upon the control electrode of said second tube to permit conduction of said second tube and energization of said translating device after the charge of said capacitor has been reduced to a given value in response to operation of said last mentioned means.

5. In combination, a three-wire alternating current source, a resistor, a first gaseous tube having a control electrode, a cathode connected through said resistor to the intermediate terminal of said source and an anode connected to one outside terminal of said source, a capacitor having one plate connected to said cathode, a discharge resistor connected between the other plate of said capacitor and said intermediate terminal, a resistor interposed between said cathode and said control electrode to impress upon the latter the potential of said cathode to afford current flow through said tube during alternate half cycles for charging said capacitor, a source of supplemental potential, a normally open switch adapted when closed to impress said supplemental potential upon said control electrode to prevent initiation of said current flow for permitting discharge of said capacitor through said resistors, and a second gaseous tube connected between said intermediate and the other outside terminal of said source and having a control electrode connected to said other plate of said capacitor to normally render said second tube non-conducting during said alternate half cycles and to render it conducting after the charge of said capacitor has been reduced to a given value in response to closure of said switch.

6. In combination, a three-wire alternating current source, a resistor, a first gaseous tube having a control electrode, a cathode connected through said resistor to the intermediate terminal of said source and an anode connected to one outside terminal of said source, a capacitor having one plate connected to said cathode, a discharge resistor connected between the other plate of said capacitor and said intermediate terminal, a resistor interposed between said cathode and said control electrode to impress upon the latter the potential of said cathode to afford current flow through said tube during alternate half cycles for charging said capacitor, a transformer having a primary winding connected to the terminals of said source and a secondary winding having one terminal connected to said cathode, a normally open switch interposed between the second terminal of said secondary winding and said control electrode for impressing upon closure of said switch the potential of said secondary winding upon said control electrode to prevent said current flow and permit discharge of said capacitor through said first and second mentioned resistors, and a second gaseous tube connected between said intermediate and the other outside terminal of said source and having a control electrode connected to said other plate of said capacitor to normally render said second tube non-conducting during said alternate half cycles and to render it conducting after the charge of said capacitor has been reduced to a given value in response to closure of said switch.

WILLIAM H. ELLIOT.

REFERENCES CITED

The following references are of record in the file of this patent:

UNITED STATES PATENTS

| Number | Name | Date |
| --- | --- | --- |
| 2,003,992 | Cockrell | June 4, 1935 |
| 2,375,456 | Wolfner | May 8, 1945 |
| 2,412,571 | Few | Dec. 17, 1946 |
| 2,442,578 | Audier | June 1, 1948 |